United States Patent [19]

Honeycutt, III

[11] 4,432,846
[45] Feb. 21, 1984

[54] CLEANING AND TREATMENT OF ETCHED CATHODE ALUMINUM CAPACITOR FOIL

[75] Inventor: LeRoy Honeycutt, III, Salisbury, N.C.

[73] Assignee: National Steel Corporation, Pittsburgh, Pa.

[21] Appl. No.: 448,817

[22] Filed: Dec. 10, 1982

[51] Int. Cl.³ ............................ C25F 3/04; C25F 1/00; C23G 1/02; B08B 3/00
[52] U.S. Cl. ............................ 204/129.95; 204/141.5; 204/207; 134/3; 134/28; 134/41
[58] Field of Search ............................... 134/3, 28, 41; 204/129.1, 129.9, 129.95, 140, 141.5, 207

[56] References Cited

U.S. PATENT DOCUMENTS

| | | | |
|---|---|---|---|
| Re. 28,105 | 5/1974 | Vermilyea et al. | |
| 2,553,937 | 5/1951 | Patrie | 204/129.95 X |
| 3,632,447 | 1/1972 | Albrecht et al. | 134/41 X |
| 3,632,486 | 1/1972 | Herrmann et al. | 204/33 |
| 3,755,116 | 8/1973 | Terai et al. | 204/129.95 |
| 3,898,095 | 8/1975 | Berdan et al. | 134/3 |
| 4,279,715 | 7/1981 | Arora et al. | 204/129.9 |
| 4,292,148 | 9/1981 | Bernard | 204/144 |
| 4,332,652 | 6/1982 | Arora et al. | 204/129.75 |

FOREIGN PATENT DOCUMENTS

| | | | |
|---|---|---|---|
| 53-19151 | 2/1978 | Japan | 204/129.1 |
| 53-116229 | 10/1978 | Japan | 204/141.5 |

*Primary Examiner*—Donald R. Valentine
*Attorney, Agent, or Firm*—O'Neil and Bean

[57] ABSTRACT

An improved method is disclosed for producing cathode aluminum foil for electolytic capcitors in which aluminum foil of 98.0% to 99.99% purity is etched in an electrolytic bath containing a chloride or hydrochloric acid in water solution while subjected to an AC and/or DC current, and treated following etching by immersion in an aqueous solution of nitric acid containing about 2.5 to about 3.7 weight percent nitric acid, rinsing, and immersion in an aqueous solution containing about 1.5 to about 5.0 weight percent chromic acid and about 3.0 to about 5.0 weight percent phosphoric acid, again rinsed to substantially completely remove chloride ions from the etched foil surface and increase the capacitance of the foil, and to substantially reduce the capacitance decay rate of the treated foil. The treated foil may be passivated in an aqueous solution of a carboxyl acid, preferably a 1.5 to 5.0 weight percent solution of citric acid in deionized water, before drying.

17 Claims, 2 Drawing Figures

CLEANING AND TREATMENT OF ETCHED CATHODE ALUMINUM CAPACITOR FOIL

BACKGROUND OF THE INVENTION

1. Field of the Invention

This invention relates to a process for producing cathode aluminum capacitor foil, and more particularly to an improved process for post etch treatment of cathode aluminum foil etched in an acid and/or salt electrolyte solution under action of an AC and/or DC current and thereafter treating the etched foil to substantially completely remove chloride ions, increase the capacitance of the foil, and reduce the capacitance decay rate of the foil.

2. Description of the Prior Art

As is known, electrolytic capacitors are conventionally constructed by winding an anode and a cathode foil into a coil, with adjacent surfaces of the two foils being separated by spacers such as sheets of paper material. The wound coil is inserted into an aluminum container which is filled with a liquid electrolyte solution and sealed. Connector tabs joined to the respective foils project outwardly through the sealed container to enable connecting the capacitor in a circuit.

Both the anode and cathode foils are typically electrolytically etched to increase the surface area, and thereby increase the capacitance of the foil. The anode foil is anodized to form an oxide coating over its entire surface. The cathode foil is not anodized although its surface may be subject to limited oxidation during storage following the etching process and prior to the foil being installed in a capacitor.

Increased emphasis is being placed upon obtaining maximum capacitance of the capacitor foil and thereby enable reduction in size of the capacitor. While size reduction inherently produces a saving in material and consequently in cost, such size reduction may be of primary concern particularly where the capacitor is to be used in miniature circuits of the type presently in common use. Although many improvements have been made in the electrolytic etching art which have resulted in increased foil capacitance, there remains a need for further improvements. Also, since it is not always possible to immediately incorporate etched foil into a sealed capacitor, it is important that deterioration of the capacitance during storage is maintained at a minimum. This is particularly true for cathode foil which is more adversely affected by the buildup of a very thin oxide film during storage than anode film which is intentionally anodized.

Usability of capacitor foil which has been etched in a chloride electrolyte solution is enhanced by efficiently removing the chlorides from the foil surface. This cleaning process conventionally comprises thoroughly washing or rinsing the foil promptly after it exits the electrolyte solution. It is also known to immerse the etched, washed foil in an aqueous solution of nitric acid for a relatively short time to remove chlorides from the etched pores. The foil must not be subjected to the action of the nitric acid for more than a very short time or a reduction in capacitance may result due to the nonelectrolyte etching, or polishing effect of the acid; however, the capacitance is actually increased during initial exposure due, it is believed, to the acid removing chlorides and oxides from the very fine pores or channels produced during electrolytic etching and thereby increasing the effective surface area. The more efficient removal of chlorides in the nitric acid solution, followed by effective water washing of the acid from the foil, will also slightly increase the storage life of the etched foil.

It is also known, for example from U.S. Pat. No. Re. 28,015, to further treat foil which has been water rinsed following etching by immersing the foil in a boiling aqueous solution of $CrO_3$ and $H_3PO_4$ to strip aluminum oxide from the foil surface, then passifying the stripped, etched foil by immersing it in a boiling aqueous solution of $CrO_3$, $H_2PO_4{-}$, and $SiO_3{=}$. This passivation treatment is intended to retard the formation of hydroxide on the aluminum surface in the presence of water and to increase the storage life of the anode foil prior to the anodizing step preparatory to constructing the electrolytic capacitor. Further, the passivation step is said to retard corrosion in the finished capacitor.

SUMMARY OF THE INVENTION

It is the primary object of the present invention to provide an improved process for producing cathode aluminum capacitor foil.

Another object is to provide an improved process for post etch treatment of electrolytically etched cathode aluminum capacitor foil.

Another object is to provide such an improved post treatment process which substantially increases the capacitance of cathode aluminum capacitor foil and which increases the storage life of such foil.

Another object is to provide an improved post etch treatment process which includes effective removal of chlorides from the surface of electrolytically etched cathode aluminum capacitor foil by immersing the foil in an aqueous solution of nitric acid and rinsing the nitric acid bath solution from the foil surface, then immersing the foil in an aqueous solution of chromic acid and phoshoric acid to effectively clean the foil by removing chlorides from the surface and substantially increase the capacitance of the foil.

Another object of the invention is to provide such an improved method of post treating cathode aluminum capacitor foil wherein the aluminum foil is immersed in the chromic and phosphoric acid solution for a time and at a temperature which will result in a small amount of chromium on the surface of the etched and cleaned aluminum foil after the solution of chromic acid and phosphoric acid is rinsed from the foil surface.

Another object of the invention is to more effectively passivate the cleaned foil by immersing the foil in a water solution of a carboxyl acid, preferably citric acid.

Another object of the invention is to provide an improved cathode aluminum capacitor foil having increased capacitance, increased storage life, and a passivated surface which substantially eliminates the production of hydrogen gas in the presence of hot water.

In the attainment of the foregoing and other objects and advantages, an important feature of the invention resides in AC and/or DC etching of cathode aluminum capacitor foil in an electrolyte solution containing a chloride or hydrochloric acid and subjecting the etched foil to a series of post etch chemical treatment steps to more effectively remove chlorides, to substantially increase capacitance, and to materially increase the storage life of the foil. The etched, treated foil is passivated in a manner which substantially eliminates the generation of hydrogen gas when the foil is in contact with water. The cleaning and chemical treatment steps include initially washing the electrolyte solution from the etched foil surface and immersing the rinsed foil in an aqueous solution of nitric acid, again rinsing the foil and immersing the rinsed foil in an aqueous solution of chromic and phosphoric acid, again rinsing the foil then immersing it in an acid passivation bath, preferably an aqueous solution of citric acid. As the foil is drawn from the passivation bath, it is dried and coiled for storage or use.

BRIEF DESCRIPTION OF THE DRAWINGS

The improved process according to the present invention will be more fully described hereinbelow with reference to the accompanying drawings in which.

DESCRIPTION OF THE PREFERRED EMBODIMENTS

Figure 1:
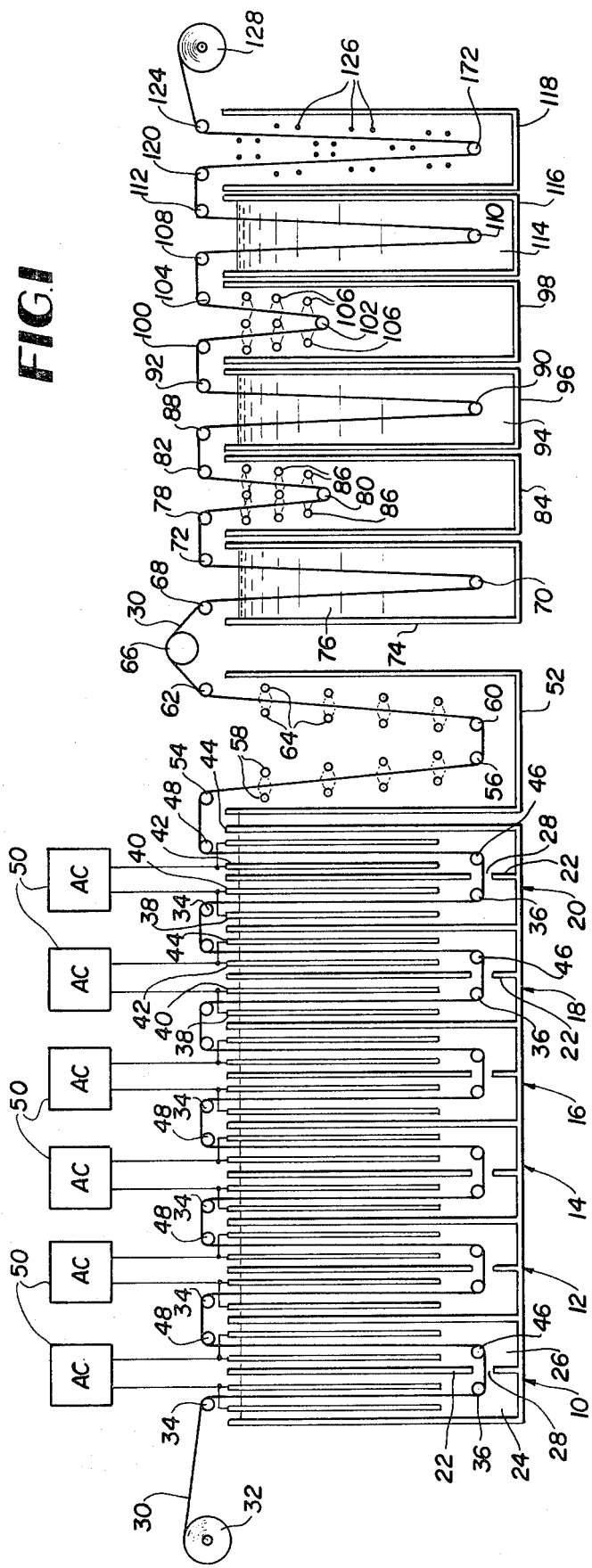
FIG. 1 is a schematic view of a cathode aluminum foil production line suitable for use in the production of cathode aluminum capacitor foil in accordance with the present invention.

Referring to the drawings, FIG. 1 schematically illustrates an AC etching and post treatment line for use in the production of cathode aluminum capacitor foil in accordance with the present invention wherein electrolytic etching is accomplished in a plurality of etching cells 10, 12, 14, 16, 18 and 20. The respective cells are substantially identical and therefore only cell 10 will be described, it being understood that the description applies equally to the remaining cells and the same reference numerals will be employed to designate corresponding elements of the different cells. Thus, cell 10 includes a vertically extending wall 22 formed from an electrically insulating material dividing the interior of the cell into two chambers 24, 26. An opening 28 in wall 22 near the bottom of the cell provides a passage for a running length of aluminum foil 30 fed from a supply reel 32 over upper and lower guide rolls 34, 36, respectively in a downward pass through compartment 24 between a pair of spaced, vertical plate electrodes 38, 40. The foil then passes through opening 28 and is guided in an upward pass through compartment 26 between a second pair of spaced plate electrodes 42, 44 by guide rolls 46, 48.

Reference numeral 50 designates an AC power supply having its two terminals connected one to the pair of spaced parallel plate electrodes in each compartment 24, 26. The electrodes of each pair are connected electrically and the guide rollers associated with each compartment guide the aluminum foil 30 in substantially equally spaced parallel relation to the electrodes in each pass.

The cell 10 is filled to a point adjacent the top of the electrodes with a suitable electrolyte, preferably a chloride bearing solution such as hydrochloric acid or salt in water solution, with the opening 28 in insulating wall 22 providing fluid communication between the two compartments of each cell. Since the two pair of electrodes in each cell are separated by an electrical insulating wall and are connected to opposite terminals of the AC power source 50, the foil being etched acts as a bipolar conductor between the two compartments.

The guide rolls adjacent the top of each cell are located as closely as practical to the top of the cell and the distance between the guide rolls at the exit of one cell to the entrance of the adjacent cell is maintained at a minimum to thereby minimize the length of time that the moving foil is exposed to the acid electrolyte material carried out of the cell on its surface without being exposed to the influence of the electric current. The etching action of the acid electrolyte material in the absence of such current can produce an undesirable machining or polishing effect which reduces surface area and the capacitance of the foil. Similarly, the distance between the bottom ends of the electrode plates in the two compartments of the adjacent cells is maintained at a minimum.

Although FIG. 1 illustrates the use of a separate single phase alternating current supply source 50 with each electrolytic cell, it should be apparent that other arrangements could be employed. For example, it is contemplated that two three-phase AC power sources may be employed in the six cell arrangement illustrated and of course the number and size of the cells may be varied if desired.

As the electrolytically etched foil strip 30 is drawn from etching cell 20 over guide roll 48, it is immediately subjected to a cleaning and post etch treatment to remove electrolyte solution and chlorides from its surface. Still referring to FIG. 1, this cleaning and post etch treatment comprises initially washing the foil in a spray tank 52 by guiding the foil in a downward path by a pair of guide rolls 54, 56 and directing a spray of water through nozzles 58 onto the surface of the moving foil. The water supplied by nozzles 58 is typically unheated and untreated water as from a municipal water supply system. The foil is then guided in an upward path by rolls 60, 62 and again rinsed, preferably by hot water, directed onto a surface as from nozzles 64. The hot rinse may also be untreated water as from a municipal water supply system.

From guide roll 62 the washed foil 30 passes over a drive roll 66 which applies the driving force to draw the foil through the electrolytic etching cells and the first rinse tank 52. From the drive roll 66, the foil is led over guide rolls 68, 70 and 72 through a first treatment tank 74 containing a treatment bath 76. The bath 76 contains about 2.5 to about 3.7 weight percent nitric acid in water solution maintained at a temperature within the range of about 45° C. to about 55° C., preferably about 50° C. The depth of the bath 76 and the speed of the foil are such as to expose the etched washed foil to the nitric acid for about 25 to about 60 seconds.

Following the nitric acid treatment, the foil is led over guide rolls 78, 80 and 82 in a downward and upward path within a second spray tank 84 where it is again thoroughly rinsed by water directed onto its surface from spray nozzles 86, and then led by guide roller 88, 90 and 92 through a second chemical treatment bath 94 contained in tank 96. Bath 94 is a water solution of chromic acid and phosphoric acid containing about 1.5 to about 5.0 weight percent of $CrO_3$ and about 3.0 to about 5.0 weight percent of $H_3PO_4$ in deionized water. The chromic-phosphoric acid treatment bath is maintained at a temperature of about 80° C. to about 100° C., preferably about 90° C., and the foil is immersed in the bath for about 25 to about 45 seconds.

Following the second chemical treatment bath, the foil is again thoroughly washed in a spray tank 98 by guiding the foil in a path through the tank by guide rolls 100, 102, 104 and directing a water spray onto the surface of the foil from nozzles 106. Preferably deionized water is used for this rinse and optionally, the deionized water collected in the bottom of the tank may be employed as the rinse water in tank 84 following the nitric acid treatment step. Also, to assure thorough washing following the chromic acid-phosphoric acid treatment, the roll 62 may be submerged in deionized water in the lower portion of the tank 98, or, if desired, a second rinsing and/or immersion washing may be employed.

After thorough washing in deionized water, the etched foil is led, by guide rolls 108, 110, 112, through a passivation solution 114 contained in tank 116. The passivation bath 114 is a solution of a carboxyl acid, preferably citric acid. The solution preferably contains about 1.8 to about 5.0 weight percent citric acid in deionized water, and the temperature of the bath is maintained at about 45° C. to about 55° C. The foil is maintained in the passivation solution for a period of about 25 to about 110 seconds to assure complete passivation.

Following the passivation treatment, the foil is led through a drying tank 118 by guide rolls 120, 172 and 124, and a plurality of calrod 126 heaters completely dry the foil. Following drying, the etched, chemically treated and passivated foil is wound on a roll 128.

The temperature of the chemical baths 76 and 94 used in the post etch treatment effects the ability of the treatment to remove chlorides and increase the capacitance of the foil. For example, in the nitric acid treatment bath, temperatures substantially in excess of 55° C. produce a marked deterioration in capacitance due, apparently, to the nitric acid etching or polishing of the foil. At temperatures below about 45° C. the nitric acid cleaning solution does not have the same synergistic effect on the subsequent cleaning in the chromic-phosphoric acid treatment solution. Also, when the temperatures of the chromic-phosphoric acid bath is below about 80° C., surface chloride removal is reduced and the desired capacitance increase may not be achieved. Temperatures of about 90° C. to 95° C. in the chromic phosphoric acid bath produce maximum chloride removal and maximum increase in capacitance without adversely affecting physical characteristics of the etched foil. Temperatures above about 95° C. result in a substantial increase in corrosive vapor release without achieving any measurable increase in chloride removal or increase in capacitance.

Electron microscope analysis of the surface of a number of etched post treated foil samples produced in accordance with the process of this invention shows metallic chromium on the surface of the aluminum. As indicated above, the presence of chromium on the surface of the foil is believed to help reduce the decay rate of the foil capacitance.

It has been found that the post etch treatment of cathode aluminum capacitor foil in the manner described above will result in a substantial increase in capacitance and substantially reduce the capacitance decay rate during storage. The following examples illustrate the increase in capacitance achieved by the process:

EXAMPLE 1

In this example, 0.0012 inch thick aluminum of 99.45% purity was etched in an electrolyte containing hydrochloric acid in water solution. Etching was accomplished on a pilot line similar to that described above but employing only two electrolytic etching cells, with the foil being advanced at a rate to provide the desired exposure time in the electrolyte while supplying AC current to the electrodes. The following 0 Volt capacitances were measured:

After etching: 1357 $\mu f/in^2$,
After nitric acid bath: 1667 $\mu f/in^2$,
After chromic-phosphoric acid bath: 2130 $\mu f/in^2$.

The nitric acid bath was maintained at 50° C. and contained about 1.5 weight percent $HNO_3$, and the chromic-phosphoric acid treatment contained 2.0 weight percent $CrO_3$ and about 3.5 weight percent $H_3PO_4$ and was maintained at 90° C. No acid passivation treatment data was kept in this test.

Figure 2:
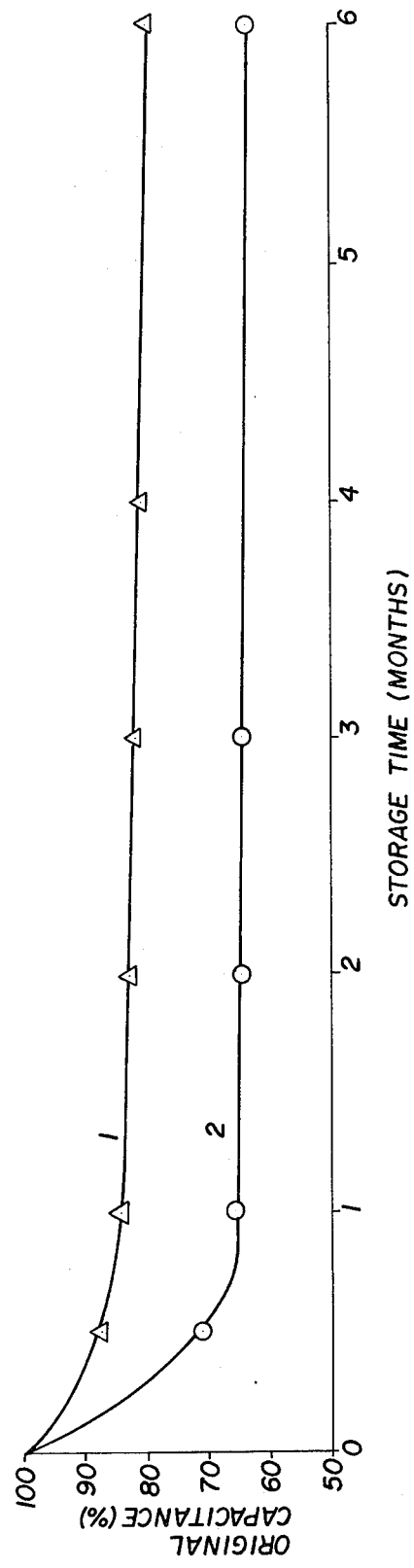
FIG. 2 is a graph comparing the capacitance decay rate of cathode aluminum capacitor foil produced in accordance with the present invention with cathode aluminum capacitor foil produced in accordance with the prior art.

In order to compare the effect of post treatment etching on capacitance decay during storage, aluminum foil etched on the pilot line equipment and subjected to the post etch treatment just described followed by a passivation treatment in citric acid, was compared with similar foil etched on the same equipment in the same manner and subjected to a post etch treatment in nitric acid followed by a phosphoric acid passivation treatment in accordance with known practice. The six month decay curve for the two foils is illustrated in FIG. 2 from which it will be seen that the post etch treatment in accordance with the present invention, as illustrated in curve 1, resulted in substantial improvement in the capacitance decay rate over the foil produced in accordance with the prior art as shown in curve 2. Since the capacitance of the foil processed in accordance with the present invention was initially greater than that processed in accordance with the prior art, FIG. 2 shows a percentage of original capacitance for etched foil plotted against time, in order to provide a direct comparison of decay rates.

EXAMPLE 2

In this example soft aluminum foil of 0.0014 inch gage and 99.45% purity was etched on the six cell equipment described above with reference to FIG. 1 using AC current and an electrolyte containing hydrochloric acid in water solution. The 0 Volt capacitance measured at various stages in the process was as follows:

After etching: 1608 $\mu f/in^2$,
After nitric acid bath: 1668 $\mu f/in^2$,
After chromic-phosphoric acid bath: 2110 $\mu f/in^2$.

The nitric acid post treatment bath was maintained at 50° C. and contained 2.7 weight percent $HNO_3$, and the chromic-phosphoric acid treatment contained 2.0% $CrO_3$ and 3.5% $H_3PO_4$ and was maintained at 93° C.

A second test was conducted in accordance with example 2, using the same type of foil and the same equipment, but with the temperature and chemical composition of the etching bath being changed slightly so that the capacitance immediately following etching was slightly less than in example 2. The nitric acid post treatment bath contained 2.7% $HNO_3$ and was maintained at 50° C., while the chromic-phosphoric acid treatment containing 2.0% $CrO_3$ and 5.1% $H_3PO_4$ was maintained at 89° C. The 0 Volt capacitances were as follows:

After etching: 1486 $\mu f/in^2$,
After nitric acid bath: 1618 $\mu f/in^2$,
After chromic-phosphoric acid bath: 2080 $\mu f/in^2$.

Again, no citric acid passivation data was kept during this test, although testing of similar foil has indicated that an increase in 0 Volt capacitance of up to 100 $\mu f/in^2$ and an increase of the 1 Volt capacitance of about 50 μf/in² is achieved in the citric acid passivation treatment. Also, comparison of etched and treated cathode capacitor foil passivated in the citric acid bath has been compared with similar foil passivated in a phosphoric acid passivation bath of the type widely used in the capacitor foil production industry. The citric acid passivated foil has consistently resulted in a substantially greater reduction in hydrogen gas generated when the passivated foil is subjected to hot water.

Although specific apparatus has been disclosed and described for AC etching of aluminum foil, the post etch treatment process of this invention may be employed in connection with foil etched by DC current as well as by a combination of AC and DC current. Thus, while preferred embodiments of the invention have been disclosed and described, it should be understood that the invention is not so limited but rather that it is intended to include all embodiments thereof which would be apparent to one skilled in the art and which come within the spirit and scope of the invention.

What is claimed is:

1. A process for post etch treatment of a running length of electrolytically etched cathode aluminum capacitor foil to remove chlorides from the etched surface and increase capacitance of the foil comprising the steps of
    passing the etched foil through a first post etch treatment bath comprising an aqueous solution of nitric acid,
    rinsing the nitric acid solution from the surface of the foil,
    passing the foil through a second post etch treatment bath comprising an aqueous solution of chromic acid and phosphoric acid, and
    rinsing the chromic acid and phosphoric acid solution from the surface of the foil.

2. The process defined in claim 1 wherein said first treatment bath comprises nitric acid in the amount of about 2.5 to about 3.7 weight percent.

3. The process defined in claim 2 wherein said first treatment bath is maintained at a temperature within the range of about 45° C. to about 55° C.

4. The process defined in claim 1 wherein said second treatment bath comprises chromic acid in the form of $CrO_3$ within the range of about 1.5 to about 5.0 weight percent.

5. The process defined in claim 1 wherein said second treatment bath comprises phosphoric acid within the range of about 3.0 to about 5.0 weight percent.

6. The process according to claim 1 wherein said first treatment bath comprises nitric acid within the range of about 2.5 to about 3.7 weight percent and wherein said second treatment bath comprises chromic acid in the form of $CrO_3$ within the range of about 1.5 to about 5.0 weight percent and phosphoric acid in the range of about 3.0 to about 5.0 weight percent.

7. The process defined in claim 6 wherein the temperature of said first treatment bath is maintained within the range of about 45° C. to about 55° C. and wherein the temperature of said second treatment bath is maintained within the range of about 80° C. to about 100° C.

8. The process defined in claim 7 wherein said electrolytically etched cathode aluminum foil is immersed in each of said first and said second treatment baths for a time within the range of about 25 to about 60 seconds.

9. The process defined by claim 1 further comprising the step of passivating said electrolytically etched cathode aluminum foil by passing the foil through a third treatment bath comprising an aqueous solution of a carboxyl acid for a time within the range of about 25 to 110 seconds, and drying the foil following withdrawal from the third treatment bath.

10. The process according to claim 9 wherein said third treatment bath comprises an aqueous solution of citric acid.

11. The process defined in claim 10 wherein said third treatment bath comprises about 1.8 to about 5.0 weight percent citric acid, balance deionized water, and wherein the passivation bath is maintained at a temperature within the range of about 45° C. to about 55° C.

12. In a process for producing cathode aluminum capacitor foil in which a running length of aluminum foil of about 98.0% to about 99.99% pure aluminum is electrolytically etched in a liquid electrolyte comprising hydrochloric acid, nitric acid and phosphoric acid in water solution while applying an electric current to electrodes immersed in the electrolyte solution in spaced relation to the foil, the improvement comprising the steps of
    water washing the running length of foil promptly upon withdrawal from the electrolyte solution to remove electrolyte solution and chlorides produced in the electrolytic etching process from the surface of the foil,
    passing the rinsed, etched foil through a first post etch treatment bath comprising an aqueous solution of nitric acid,
    rinsing the nitric acid solution from the surface of the foil promptly upon withdrawing the foil from the first post etch treatment bath,
    passing the washed foil through a second post etch treatment bath comprising an aqueous solution of chromic acid and phosphoric acid, and
    rinsing the chromic acid and phosphoric acid solution from the surface of the foil promptly upon withdrawal from the second post etch treatment bath.

13. The process defined in claim 12 wherein deionized water is used to rinse the foil following withdrawal from said first and said second post etch treatment baths.

14. The process defined in claim 13 wherein said first post etch treatment bath is maintained at a temperature within the range of about 45° C. to about 55° C. and comprises nitric acid in the amount of about 2.5 to about 3.7 weight percent, and
    said second post etch treatment bath is maintained at a temperature within the range of about 80° C. to about 100° C. and comprises $CrO_3$ within the range of about 1.5 to about 5.0 weight percent and $H_3PO_4$ within the range of about 3.0 to about 5.0 weight percent.

15. The process defined in claim 14 wherein said electolytically etched cathode aluminum capacitor foil is immersed in each of said first and said second treatment baths for a time within the range of about 25 to about 60 seconds.

16. The process defined in claim 15 further comprising the steps of passivating said electrolytically etched cathode aluminum capacitor foil by passing the foil through a third post etch treatment bath comprising an aqueous solution of a carboxyl acid for a time within the range of about 25 to about 110 seconds, and
    drying the etched, treated and passivated foil following withdrawal from the third post etch treatment bath.

17. The process according to claim 16 wherein said third post etch treatment bath is maintained at a temperature within the range of about 45° C. to about 55° C. and comprises an aqueous solution of citric acid containing about 1.5 to about 5.0 weight percent citric acid.

* * * * *